E. A. CALAHAN.
2 Sheets—Sheet 1.
Printing Telegraph.
No. 3,810.
Reissued Jan'y 25, 1870.
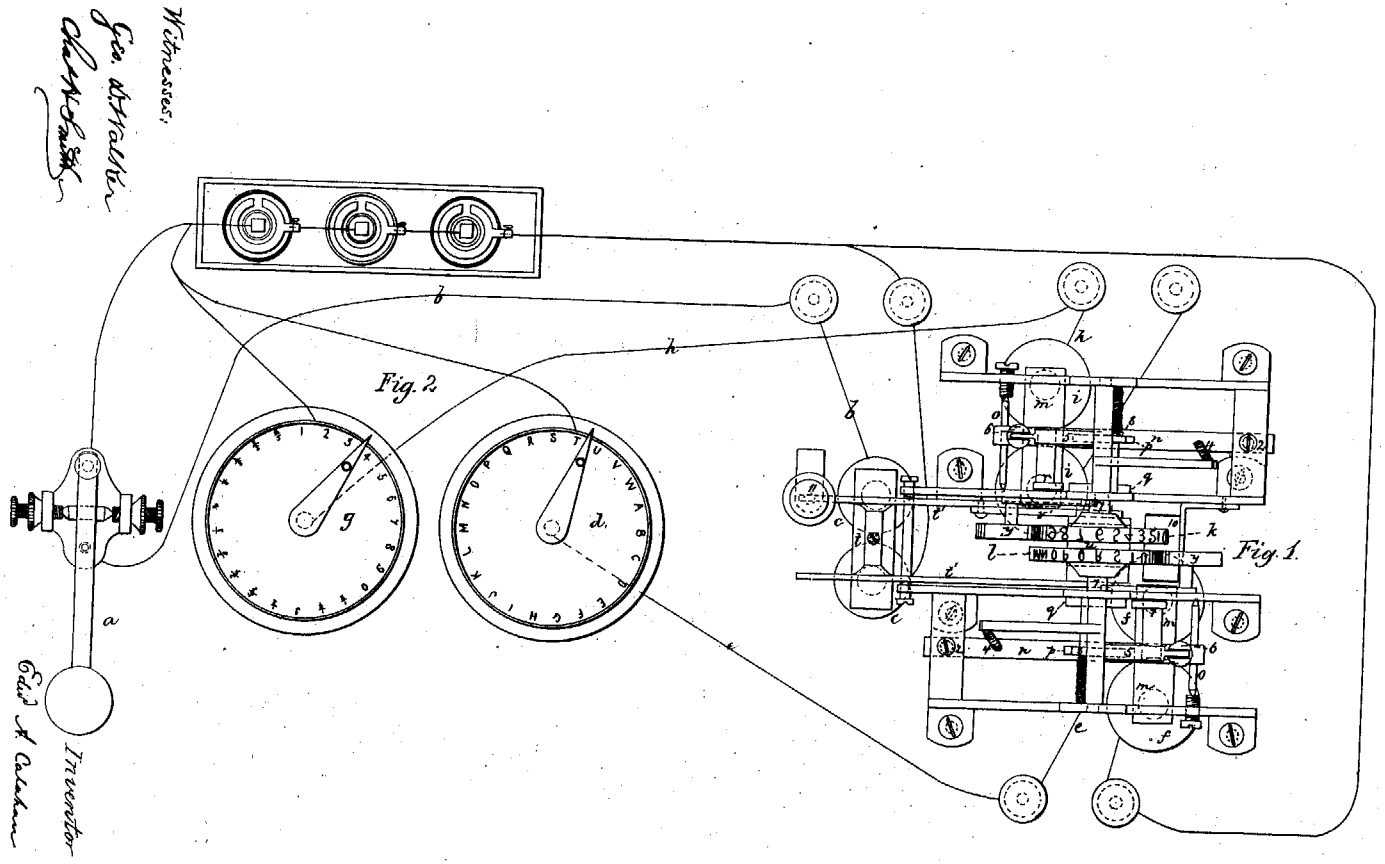
N. PETERS, Photo-Lithographer, Washington, D. C.

E. A. CALAHAN.

2 Sheets—Sheet 2.

Printing Telegraph.

No. 3,810.

Reissued Jan'y 25, 1870.

Witnesses: Geo. D. Walker, Chas. H. Smith

Inventor. Edw^d. A. Calahan.

N. PETERS, Photo-Lithographer, Washington, D. C.

UNITED STATES PATENT OFFICE.

THE GOLD AND STOCK TELEGRAPH COMPANY, OF NEW YORK, ASSIGNEES OF EDWARD A. CALAHAN, OF BROOKLYN, N. Y.

IMPROVEMENT IN PRINTING-TELEGRAPHS.

Specification forming part of Letters Patent No. 76,993, dated April 21, 1868; Reissue No. 3,810, dated January 25, 1870.

*To all whom it may concern:*

Be it known that EDWARD A. CALAHAN, of Brooklyn, in the county of Kings and State of New York, has invented, made, and applied to use a certain new and useful Improvement in Telegraphic Printing-Instruments for Registering Gold, Stocks, &c.; and the following is declared to be a full, clear, and exact description of the said invention, reference being had to the annexed drawings, making part of this specification, wherein—

Figure 3:
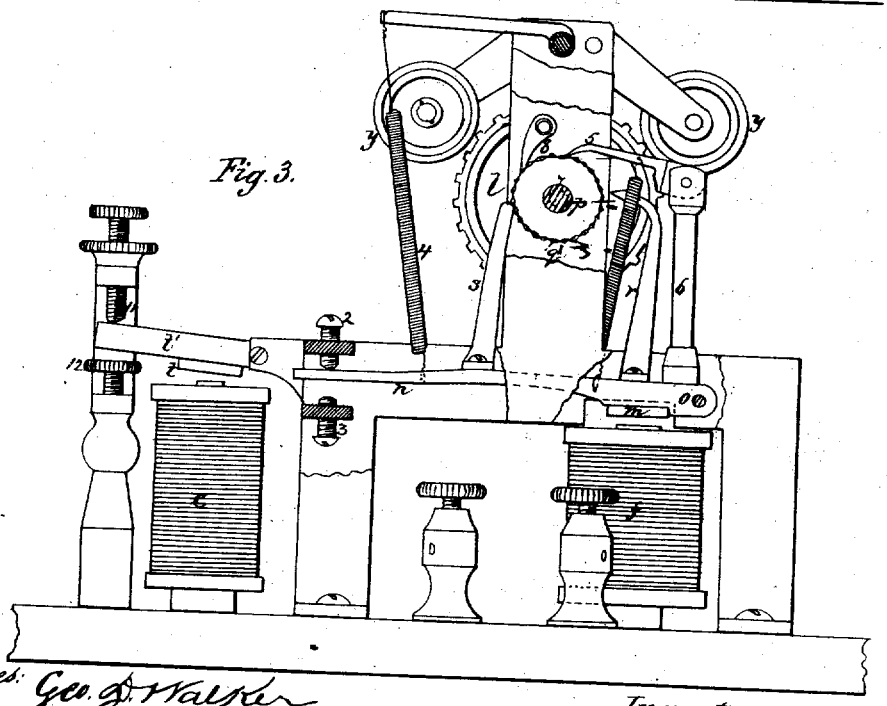

Figure 1 is a general plan of said apparatus. Fig. 2 is a plan in smaller size, illustrating the manner in which the wires are arranged in respect to the receiving and transmitting instruments. Fig. 3 is an elevation of the receiving-instrument, the frame being partially broken open.

Similar marks of reference denote the same parts.

It is often desired, particularly in large cities, to keep a correct record of various fluctuations in the price of gold, stocks, and articles of trade, and to have these fluctuations simultaneously and periodically denoted and registered at the various centers of business connected with one central transmitting-station.

This invention is intended to accomplish the said objects in a very reliable manner, and to dispense with the complicated mechanism heretofore made use of to cause an impression to be made when the type-wheel has been brought to a proper position. A magnet and armature are employed in effecting the movement of the type-wheel, so that the same is turned to the required position, and then by an independent motion separately controlled from that of the type-wheel the impression is made, so that the type-wheel can remain after it is adjusted or be again moved previous to the impression being made. The impression is made on a strip of paper by two type-wheels, so that the printing is in two lines, and the figures and fractions for denoting the prices or quotations are contained upon a wheel and combined therewith. Letters are provided for printing on the same strip of paper to denote the article to which the quotations relate. As the different machines will generally be but a short distance apart, it is preferred to make use of two or more wires communicating through the entire circuit of machines. One of these wires transmits the pulsations of electricity that act upon a magnet and adjust the type-wheel to the proper letter or number. The other wire transmits the pulsations of electricity, which, acting in a magnet, produce the impression upon the paper. In the drawings three circuit-wires are represented—one for the alphabet-wheel, another for the number or figure wheel, and the third for giving the impression; but the number of wires employed is unlimited.

In the drawings, *a* is a finger-key in the circuit *b* to the magnet *c*.

*d* is a transmitting-instrument formed with a hand that is moved around from one letter to another, and in so doing makes and breaks the circuit *e* to the letter-wheel magnet *f*, giving a pulsation of electricity for each letter.

*g* is a transmitting number-instrument formed to correspond generally with the letter-transmitting instrument *d*, and *h* is the circuit thereof to the magnet *i* of the number-wheel *k*.

The finger-key *a* and dials *g* and *d*, being known, do not require further description, and it is remarked that the mode of arranging several receiving-instruments in a line, so as to be worked by one battery, is well known, the connections being such that all the magnets *f* are in the circuits *e*, and so on.

The type-wheels *k* and *l* are provided with the desired letters, numbers, or characters. The wheel *k* is shown as formed with numerals and fractions for printing the required prices, and the wheel *l* is provided with the necessary letters of the alphabet, so as to be used in printing names. The mechanism between the magnets and the respective type-wheels being the same, it is only necessary to describe the same on one side of the machine.

The armature *m*, with its lever *n*, swings on the axis *o*, and the amount of motion is regulated by the screws 2 and 3, and 4 is a spring to lift the armature and lever.

5 is a pawl on the arm 6 of the armature *m*, that acts to turn the ratchet-wheel *p* upon the shaft 7 of the type-wheel one tooth each time the magnet is charged.

8 is a pawl to keep the wheel *p* from turning back.

*q* is a second ratchet-wheel on the shaft 7, its teeth standing the reverse to the teeth of the wheel *p*, and *r* and *s* are pawl-arms from the lever *n*, taking on opposite sides of the wheel *q*.

It will now be seen that when the armature is attracted by the magnet the pawl 5 turns the type-wheel one letter by acting on the ratchet *p*, and at the same time the pawl-arm *r* takes one of the teeth of the reverse ratchet-wheel *q*, rendering it impossible for the momentum to turn the type-wheel too far, and effectually blocking the same. As the electrical circuit is broken and the armature rises the arm *s* comes against the ratchet *q* to prevent motion while the printing is being performed. This arrangement of mechanism insures greater accuracy in the movement of the type-wheels, and prevents mistakes when the movement is rapid.

The two type-wheels *k* and *l*, although on separate shafts, stand contiguous to each other, so as to be impressed separately or jointly upon the same strip of paper that is fed along beneath them, the impression from the respective wheels forming two different lines of printing.

The means shown for printing are the magnet *c* and finger-key *a*, so that whenever either or both type-wheels are properly set the finger-key *a* is to be closed to operate by the magnet *c* on the armature *t* and throw the impression roller or surface *u* upward, carrying with it the paper strip *x* and impressing it upon the type or types.

Figure 4:
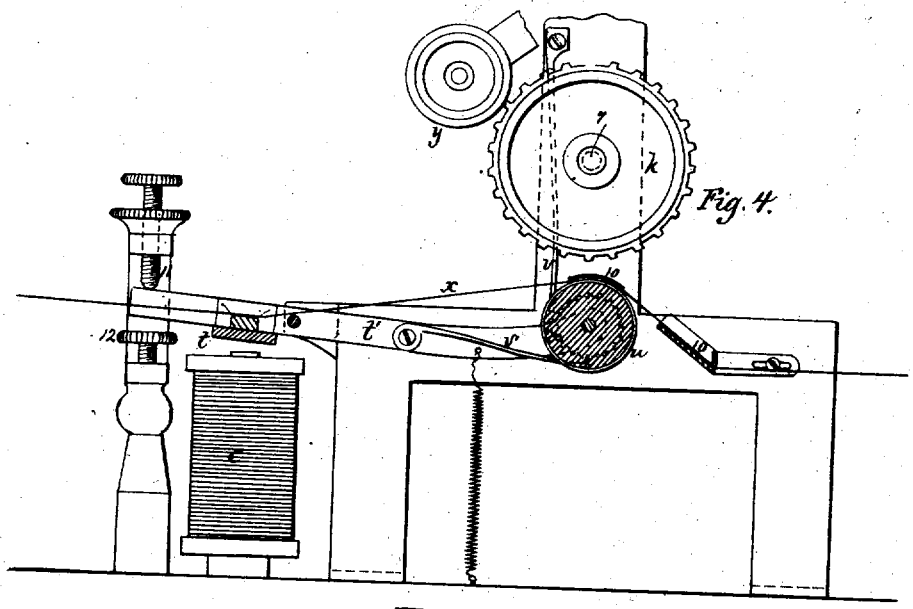

The roller *u* (see Fig. 4) is shown as operated upon by the hanging pawl *v* to turn the same the amount necessary to feed the paper along, and the pawl *v'* on the armature-lever frame *t'* prevents the roller *u* turning back. The paper is guided in the loops or guides 10, and the motion of the armature is regulated by the screws 11 and 12.

It will now be understood that this apparatus is especially adapted to giving simultaneously at different points and with great reliability the most recent quotations in the price of gold, stocks, or other articles, as the same may be reported at a central station.

Each of the wheels *l* and *k* has a blank space that is turned toward the paper while the other wheel only is being printed from.

The inking-rollers *y y*, in contact with the respective type-wheels, serve to ink the same.

The roller that feeds the paper along might be operated by ratchet-wheels and pawls similar to those that move the type-wheels.

The magnet that gives the impression may be placed directly in the main electric circuit; or it may be operated from the main current by a relay and local circuit. This machine seldom requires attention, except to supply paper from time to time and moisten the inking-rollers, because all the movements of the receiving and registering mechanism are effected by the electricity itself, thus rendering the machine entirely automatic.

What is claimed as the invention of said E. A. CALAHAN is—

1. A type-wheel receiving its motion from a magnet in one main circuit, and a magnet in a second main circuit for giving the impression, in combination with means for moving the paper by the reverse movement of the armature of the magnet of the second main circuit, substantially as set forth.

2. Two or more type-wheels moving independently and controlled by magnetism, and arranged so as to print jointly or separately upon one strip of paper in two or more lines, substantially as specified.

3. The combination of the type-wheels *k* and *l*, magnets *f* and *i* with the magnet *c* and impression-roller *u* or its equivalent, substantially as set forth.

4. The reverse ratchet-wheel *q* and stop or pawl *r*, in combination with the ratchet-wheel *p* and pawl 5 for moving and holding the type or character wheel, substantially as set forth.

5. The stop-pawl *s*, in combination with the armature-lever *n*, type-wheel *l*, ratchet-wheel *q*, and pawl 8 for adjusting or holding the type-wheel in position while the impression is being made, substantially as specified.

Dated August 12, A. D. 1868.

GEO. B. FIELD, *President.*
H. L. HOTCHKISS, *Sec'y.*

Witnesses:
CHAS. H. SMITH,
GEO. DENNETT WALKER.